(12) United States Patent
Williams

(10) Patent No.: US 6,357,639 B1
(45) Date of Patent: Mar. 19, 2002

(54) LOWER LEG MOUNTED FISHING POLE HOLDER

(76) Inventor: Rodney E. Williams, 1195 Borden Rd., San Marcos, CA (US) 92069

(*) Notice: Subject to any disclaimer, the term of this patent is extended or adjusted under 35 U.S.C. 154(b) by 0 days.

(21) Appl. No.: 09/794,675

(22) Filed: Feb. 27, 2001

(51) Int. Cl.⁷ .................................................. A45F 5/00
(52) U.S. Cl. ........................ 224/222; 224/200; 224/245; 224/251; 224/922; D3/221; D3/260
(58) Field of Search ................................. 224/200, 222, 224/267, 242, 245, 251, 922, 911; D3/221, 260

(56) References Cited

U.S. PATENT DOCUMENTS

| | | |
|---|---|---|
| 1,174,319 A | 3/1916 | Hipwood |
| 1,583,181 A | 5/1926 | Rubio |
| 1,761,497 A | 6/1930 | Smith |
| 1,786,254 A | 12/1930 | Meehan |
| 2,075,779 A | 3/1937 | Johnson et al. .................. 30/9 |
| 2,271,136 A | 1/1942 | Geiger |
| 2,298,694 A | 10/1942 | Haislip |
| 2,969,899 A | 1/1961 | Brooks |
| 3,208,653 A * | 9/1965 | Wallace |
| 3,282,482 A | 11/1966 | Scharsu |
| 3,874,573 A | 4/1975 | Fruscella et al. |
| 4,029,242 A * | 6/1977 | Stoesser |
| 4,569,466 A | 2/1986 | Webber |
| 4,587,757 A | 5/1986 | Lirette ......................... 43/21.2 |
| 4,802,612 A | 2/1989 | Anderson |
| 5,024,018 A | 6/1991 | Ferrigno ..................... 43/21.2 |
| 5,123,578 A | 6/1992 | Morse |
| D335,031 S | 4/1993 | Resnik et al. ................. D3/104 |
| 5,386,932 A | 2/1995 | Gross .......................... 224/200 |
| 5,511,336 A | 4/1996 | Bishop ........................ 43/21.2 |
| 5,520,312 A | 5/1996 | Maddox ...................... 224/607 |
| 5,568,889 A * | 10/1996 | Holloway, Jr. et al. |
| 5,810,222 A * | 9/1998 | Shoemaker |
| 5,813,162 A * | 9/1998 | Tse et al. |
| D414,331 S * | 9/1999 | Litchenberger |
| 5,956,883 A | 9/1999 | Krouth et al ................. 43/21.2 |
| 5,967,393 A * | 10/1999 | Clark, III |
| 5,988,467 A * | 11/1999 | Brustein |
| 6,003,746 A | 12/1999 | Richardson .................. 224/200 |
| 6,029,872 A | 2/2000 | Ellington ..................... 224/251 |
| 6,138,976 A | 10/2000 | Fahringer .................... 248/518 |
| 6,269,990 B1 | 8/2001 | Gray ........................... 224/200 |

\* cited by examiner

Primary Examiner—Gregory M. Vidovich
(74) Attorney, Agent, or Firm—Michael H. Jester

(57) ABSTRACT

A holster is sewn from durable waterproof synthetic woven fabric to provide a primary pocket. The holster is held to the outer side of a fisherman's lower leg by upper and lower VELCRO® equipped fabric straps stitched to the holster and wrapped around the lower leg. A plastic tube is supported in the primary pocket of the holster and is dimensioned to removably receive the handle of a fishing pole and provide its sole support. The tube is forwardly and laterally inclined relative to the fisherman's lower leg so that the upper free portion and tip of the fishing pole are positioned in front, and to the right, of the fisherman for convenient baiting of the hook and removal of fish that have been caught. The holster is fabricated with a secondary pocket that forms a fishing knife sheath and a strap loop that holds a pair of fisherman's pliers.

16 Claims, 5 Drawing Sheets

LOWER LEG MOUNTED FISHING POLE HOLDER

FIELD OF THE INVENTION

The present invention relates to fishing, and more particularly, to devices used to hold fishing poles or rods that free up a fisherman's hands for accomplishing other tasks.

BACKGROUND OF THE INVENTION

While fishing with a fishing pole, it is frequently necessary for a fisherman to use both hands for threading a line and attaching lures, hooks, leaders and other fishing tackle to the line. Other tasks requiring the use of both hands include baiting, cleaning fouled hooks and removing fish that have been caught. Freeing both hands from the fishing pole normally means that the fisherman must let go of the fishing pole, running the risk of losing it overboard or fouling the reel or line. When fishing from the shore, fishermen often lean the pole against a chair or pier railing, and the pole often falls down. On a vessel, fishermen often lean the pole over the gunwales, only to have it fall down as the vessel pitches from side to side. Besides the inconvenience of picking up a fishing pole, the fishing pole can be damaged when it falls. Furthermore, the fishing pole's line can become tangled when the fishing pole falls over, especially when several adjacent fishing poles fall together into a pile.

On frequent occasions fishermen prefer to relax and fish "hands free." Some lakes allow fishing with a two pole license, Fishermen would therefore like to be able to take their hands off of the handle of the fishing pole and let the pole rest in an upwardly inclined orientation so they can attend to other tasks, like eating a snack or opening a canned beverage. In the absence of auxiliary equipment for holding the fishing pole, this requires that the pole be leaned against a railing or an object, or laid on the ground or vessel floor. Sometimes a fisherman will awkwardly try to hold the pole between his or her legs.

A number of fishing pole holders have been designed to alleviate the foregoing problems. Many have been patented in the United States beginning in the nineteenth century. One type of fishing pole holder that is used near the shoreline consists of a cup or other fishing pole handle receptacle attached to a spike which is driven into the dirt, mud or sand at an inclined angle. See, for example, U.S. Pat. No. 4,455,779 of Cosic granted Jun. 26, 1984. These spike-mounted fishing pole holders are often hard to drive into rocky soil, are not easily moved and are unsuitable for use on a pier or on a vessel. Many fishing pole holders in the form of free-standing frames have been developed for use on piers and shorelines, but they are bulky and immobile. See, for example, U.S. Pat. No. 5,533,295 of Hochberger granted Jul. 9, 1996. Numerous fishing pole holders have been developed in the form of brackets which attach to chairs, vessel gunwales and railings. See, for example, U.S. Pat. No. 5,325,620 of Reed et al. granted Jul. 5, 1994, U.S. Pat. No. 4,017,050 of Rosenau granted Apr. 12, 1977, and U.S. Pat. No. 4,682,438 of Arrow granted Jul. 28, 1987. They are often unduly complex and immobile. They also rust and are difficult to adjust. In many cases, they require permanent attachment with screws and the like.

Body-mounted fishing pole holders have been developed in an attempt to overcome the foregoing drawbacks. A body-mounted fishing pole holder is particularly attractive to fishermen who like to walk along the bank of a lake or stream so they can cast into a deep spot. Such fishermen often end up casting from rocks or steeply inclined bank areas that make it very difficult to bait their fishing pole and remove fish once caught because the pole cannot be easily stood on its end or laid down. Body-mounted fishing pole holders that have heretofore been developed have not experienced widespread adoption and use because they have not been designed to afford maximum comfort and convenience, they have been too expensive to manufacture and sell at low cost and/or they have lacked the required durability for the harsh conditions encountered by fishermen. Many of these devices have consisted of complicated harnesses. See, for example, U.S. Pat. No. 4,858,354 of Butts granted Aug. 22, 1989, U.S. Pat. No. 3,282,482 of Scharsu granted Nov. 1, 1966, and U.S. Pat. No. 5,520,312 of Maddox granted May 28, 1996. Others have consisted of handle receptacles mounted to a waist belt, which devices unduly restrict motion, are ill suited for sitting, do not adequately stabilize the fishing pole and place the tip of the pole too far away from the fisherman's hands. See, for example, U.S. Pat. No. 1,174,319 of Hipwood granted Mar. 7, 1916, U.S. Pat. No. 3,874,573 of Fruscella et al. granted Apr. 1, 1975, U.S. Pat. No. 4,569,466 of Webber granted Feb. 11, 1986 and U.S. Pat. No. 5,386,932 of Gross granted Feb. 7, 1995.

U.S. Pat. No. 5,511,336 of Bishop granted Apr. 30, 1996 discloses a fishing pole holder having a hip plate made of thin, flexible plastic and a cylindrical tube attached to the hip plate. The hip plate is worn on a fisherman's belt and the handle of the fishing pole is inserted into the tube. This holder places the tip of the fishing pole too far away from the fisherman's hands. It is not comfortable to wear, and it does not allow the fisherman to easily sit with the pole mounted therein. Due to its molded plastic construction, a significant investment in tooling would be required to manufacture the patented fishing pole holder of Bishop.

U.S. Pat. No. 5,956,883 of Krouth et al. granted Sep. 28, 1999 discloses a fishing pole holder comprising a concave, convex frame attached to the fisherman's lower leg. The frame has a boss with a polygonal pilot hole. A pole holding assembly including a swivel mechanism has a polygonal pin which is inserted into the pilot hole to allow for angular adjustment. The patented fishing pole holder of Krouth et al. is too complex and expensive to manufacture, and not readily adapted to support various pole sizes, particularly larger poles. In addition, all of the load of the fishing pole is transferred to a small region adjacent the boss which can lead to uncomfortable chafing against the fisherman's lower leg. The pole holding assembly of Krouth et al. projects too far outward from the fisherman's leg and can snag on branches and boat hardware.

U.S. Pat. No. 6,003,746 of Richardson granted Dec. 21, 1999 discloses a body-mounted, strap-on fishing pole holder including a stabilized vertical frame upon which is secured a rotatable rod receiving element which is adjustable to any desired vertical angle. Stabilization is achieved by the use of rigid U-shaped members that are attached at vertically spaced locations on the vertical frame and surround the waist and thigh of the fisherman. Belts are connected to the ends of the U-shaped members for encircling the corresponding body portion. The patented fishing pole holder of Richardson is overly complex and subject to mechanical failures. It also places the tip of the fishing pole too far away from the fisherman's hands.

U.S. Pat. No. 6,138,976 of Fahringer, Sr. granted Oct. 21, 2000 discloses a fishing pole holder consisting of straps and snaps that connect the upper portion of the pole to the fisherman's wrist and the lower handle portion of the fishing pole to the fisherman's ankle. This design is not suited for sitting, and it is tedious to connect and disconnect the pole from the wrist and ankle each time the fisherman wants to bait, cast and unhook fish. The fishing pole holder of Fahringer, Sr. is not adapted to allow hands free fishing once the line has been cast.

U.S. Pat. No. 1,761,497 of Smith granted Jun. 3, 1930 discloses a fishing pole holder held to the fisherman's thigh with a pair of adjustable straps. The holder comprises a flat metal plate with a lower socket device in which the butt-end of the pole is seated and an upper spring clasp device including a pair of resilient branched arms. A pair of semi-circular jaws are pivotally connected to the arms. The jaws may be closed about the fishing pole by pressing the rod against the pivot joint between the jaws. The patented fishing pole holder of Smith is overly complex from a mechanical standpoint, subject to rusting and breakage, and ill suited for holding a variety of fishing poles, particularly larger ones. The Smith holder does not conveniently place the tip of the pole in the best location and its metal plate would be very uncomfortable pressing against the fisherman's thigh.

U.S. Pat. No. 6,029,872 of Ellington granted Feb. 29, 2000 discloses a plastic fishing pole holder with an upper end that clips over the waistband of a swimsuit, a lower end held by a strap to the fisherman's thigh, and an intermediate flared and slotted tubular rod holder. This device would be expensive to mold, uncomfortable to wear, and would not support the weight of larger fishing poles. In addition, the patented fishing pole holder of Ellington does not conveniently position the upper free portion of the fishing pole.

It can be safely said that there has been a long felt need for an improved, versatile body-mounted fishing pole holder that is convenient, comfortable, inexpensive, lightweight and durable.

SUMMARY OF THE INVENTION

It is therefore object of the present invention to provide an improved body-mounted fishing pole holder that allows for more convenient stowage and retrieval of a fishing pole.

It is another object of the present invention to provide an improved body-mounted fishing pole holder that will place the tip of the pole in a more convenient location for baiting and fish removal.

It is still another object of the present invention to provide an improved body-mounted fishing pole holder that is adapted for either standing or sitting.

It is yet another object of the present invention to provide an improved body-mounted fishing pole holder that is inexpensive to manufacture yet very durable.

It is a further object of the present invention to provide an improved body-mounted fishing pole holder that is easy to don and remove and comfortable to wear.

It is yet another object of the present invention to provide an improved body-mounted fishing pole holder that is lightweight.

It is still a further object of the present invention to provide an improved body-mounted fishing pole holder that can also provide convenient storage for accessories such as a knife and fisherman's pliers.

In accordance with the present invention a fishing pole holder comprises a holster sized to overlie an outer lower leg portion of a fisherman. The holster has a receptacle sized and configured for removably receiving a lower handle portion of a fishing pole. The receptacle provides the sole support for the fishing pole without requiring any auxiliary holder connected to any other part of the fishing pole or the use of a hand or an arm of the fisherman. Straps removably secure the holster to the lower leg portion of the fisherman. The holster is configured for inclining the lower handle portion of the fishing pole in a forward direction away from the outer lower leg portion of the fisherman so that an upper free portion of the fishing pole extends in a generally upright orientation. The upper free portion of the pole is therefore inclined in the forward direction away from the fisherman's torso to position the tip of the pole for convenient two-handed baiting of a hook attached to a fishing line of the fishing pole and two-handed removal of a fish from the hook.

According to the preferred embodiment of the present invention, a fishing pole holder includes a holster sewn from durable waterproof synthetic woven fabric to provide a primary pocket. The holster is held to the outer side of a fisherman's lower leg by upper and lower fabric straps stitched to the holster and wrapped around the lower leg. The straps are releasably secured with adjustable mating VEL-CRO® barb and loop fabric sections. A plastic tube is supported in the primary pocket of the holster. The tube is dimensioned to slidingly receive and removably the handle of a fishing pole and provide its sole support. The tube is forwardly inclined relative to the fisherman's lower leg so that the upper free portion of the fishing pole extends in a forward direction away from the torso of the fisherman. A neoprene spacer block is secured to an upper end of the holster on its rear side for also inclining the tube laterally so that the upper free portion of the fishing pole also extends in a sideways direction away from the torso of the fisherman. The tip of the fishing pole is therefore positioned in front, and to the right, of the fisherman for convenient baiting of the hook and removal of fish that have been caught. The fishing pole holder is versatile in that it can be comfortably used in either a standing or sitting position. The holster is fabricated with a secondary pocket that forms a fishing knife sheath and a strap loop that holds a pair of fisherman's pliers.

The present invention also provides a method of fishing which involves the steps of removably securing a holster around the fisherman's lower leg, the holster having a forwardly inclined receptacle for removably receiving and supporting the lower handle portion of a fishing pole. The upper free portion of the fishing pole is inclined forwardly away from the fisherman's torso. By inserting the pole into the receptacle, the fisherman can easily accomplish two-handed baiting of the hook and removal of fish therefrom between casting and reeling in catches.

BRIEF DESCRIPTION OF THE DRAWINGS

Other objects and advantages of my fishing pole holder invention will best be understood in connection with the following drawing figures of a preferred embodiment thereof in which like reference numerals refer to like parts throughout.

DESCRIPTION OF THE PREFERRED EMBODIMENT

As used herein the term "fishing pole" shall mean the same as "fishing rod", both terms referring generally to the conventional combination of an elongated pole or rod, and a reel. The lower portion of the pole aft of the reel provides a handle. A mono-filament line or other synthetic fishing line is wound about the reel and threaded along the upper free (and more flexible) portion of the pole through "eyes" or metal rings spaced along the upper free portion. The fishing line leaves the tip of the fishing pole and a hook is fastened to its terminal end, as well as weights, bobbers, lures, and/or other fishing tackle. The elongated pole is typically made of tapered fiberglass or graphite composite material which is strong, resilient, flexible and lightweight. In antique fishing poles bamboo and other wooden poles are employed. The term "fishing pole" as used herein includes surf poles, rods having open face reels, bait casters, rods having spinning reels, rods having bottom rigs and trolling rigs and any other fishing pole designed to be gripped by a fisherman, except for fly rods used for fly casting.

Figure 1:
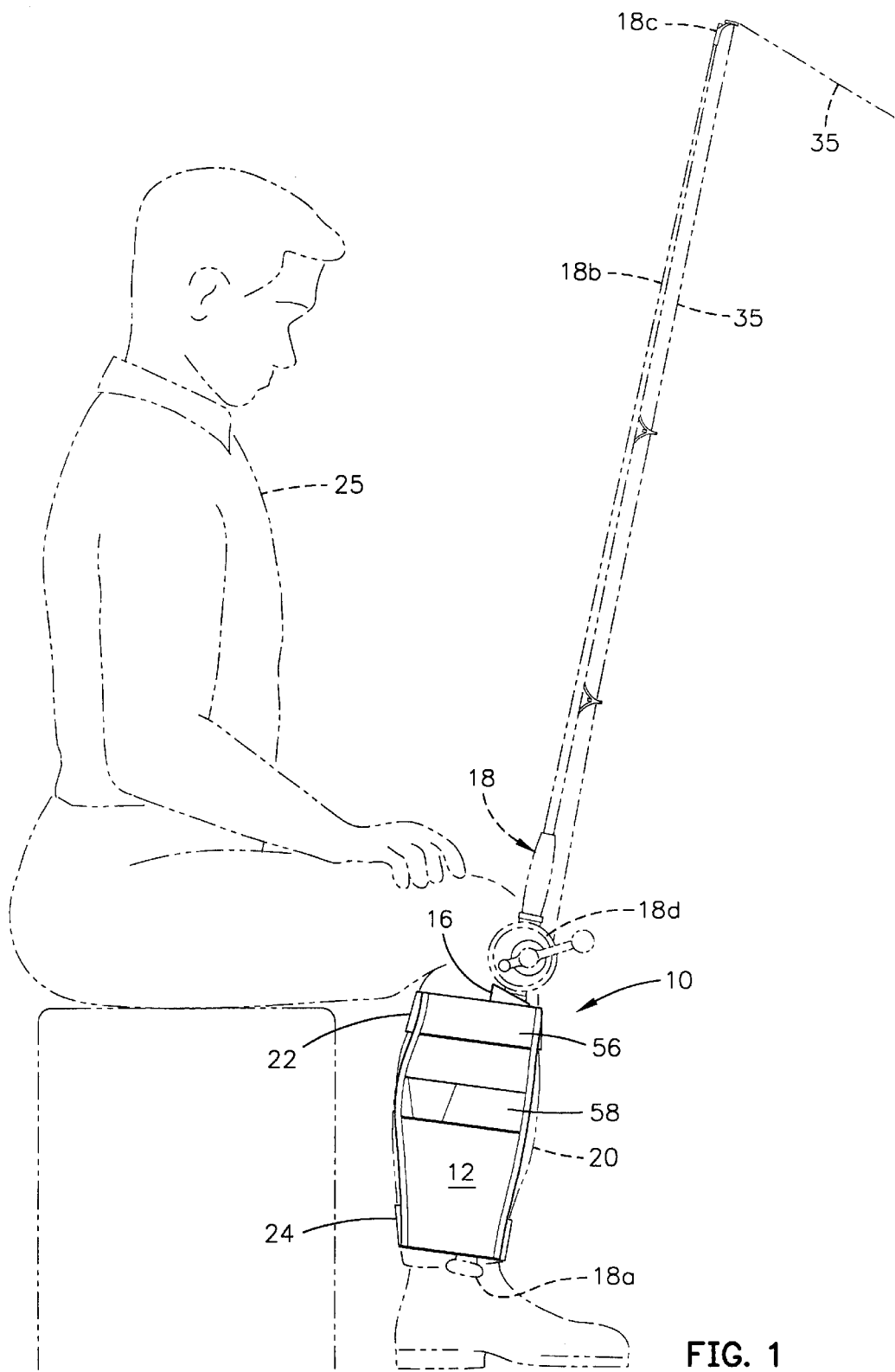
FIG. 1 is a side elevation view of a seated fisherman with a preferred embodiment of the fishing pole holder of the present invention mounted on his right lower leg. The fisherman and fishing pole are illustrated in phantom lines since they are not part of my invention.
Figure 2:
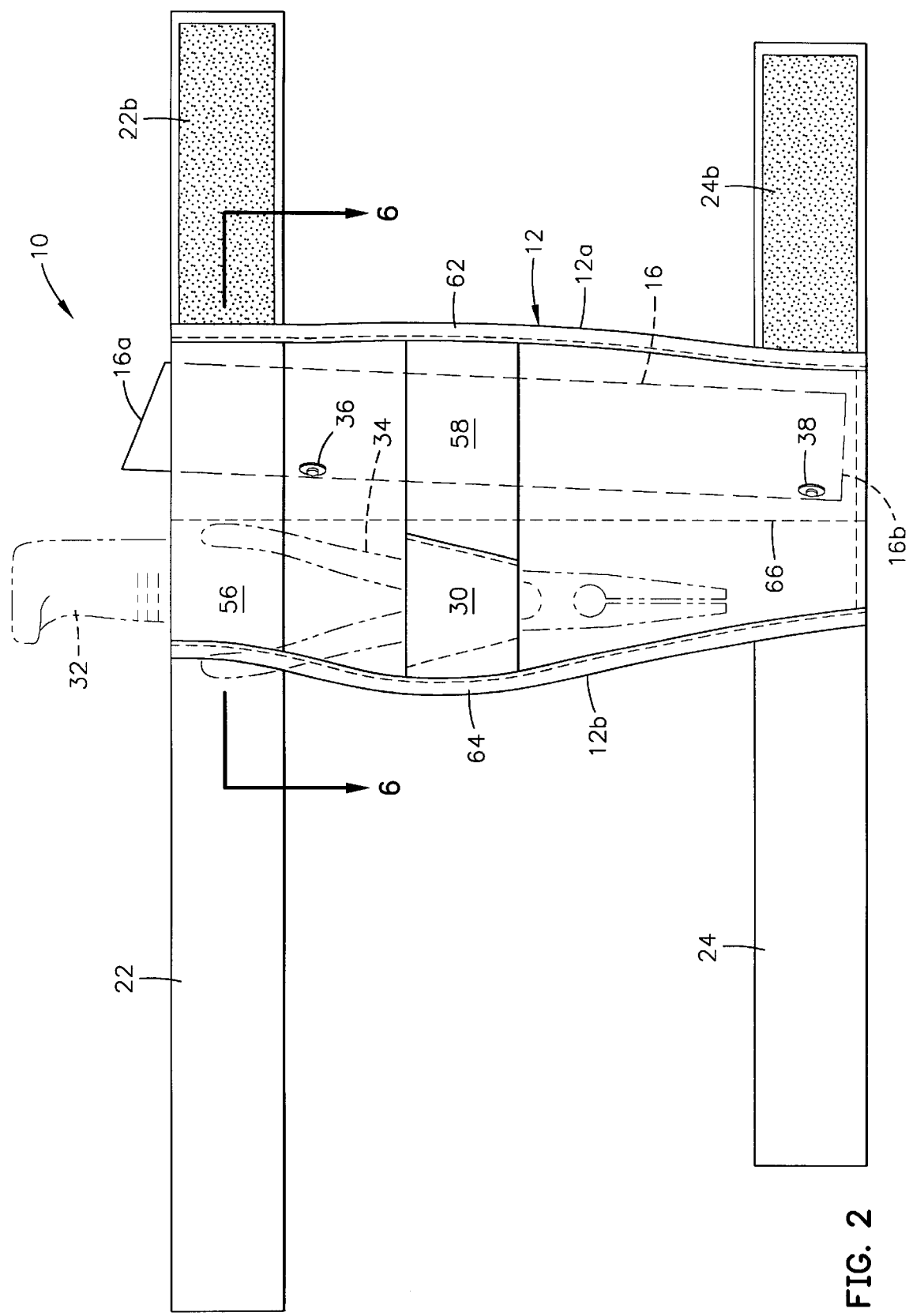
FIG. 2 is an enlarged side elevation view of the front side of the fishing pole holder of FIG. 1 with its straps laid flat.
Figure 4:
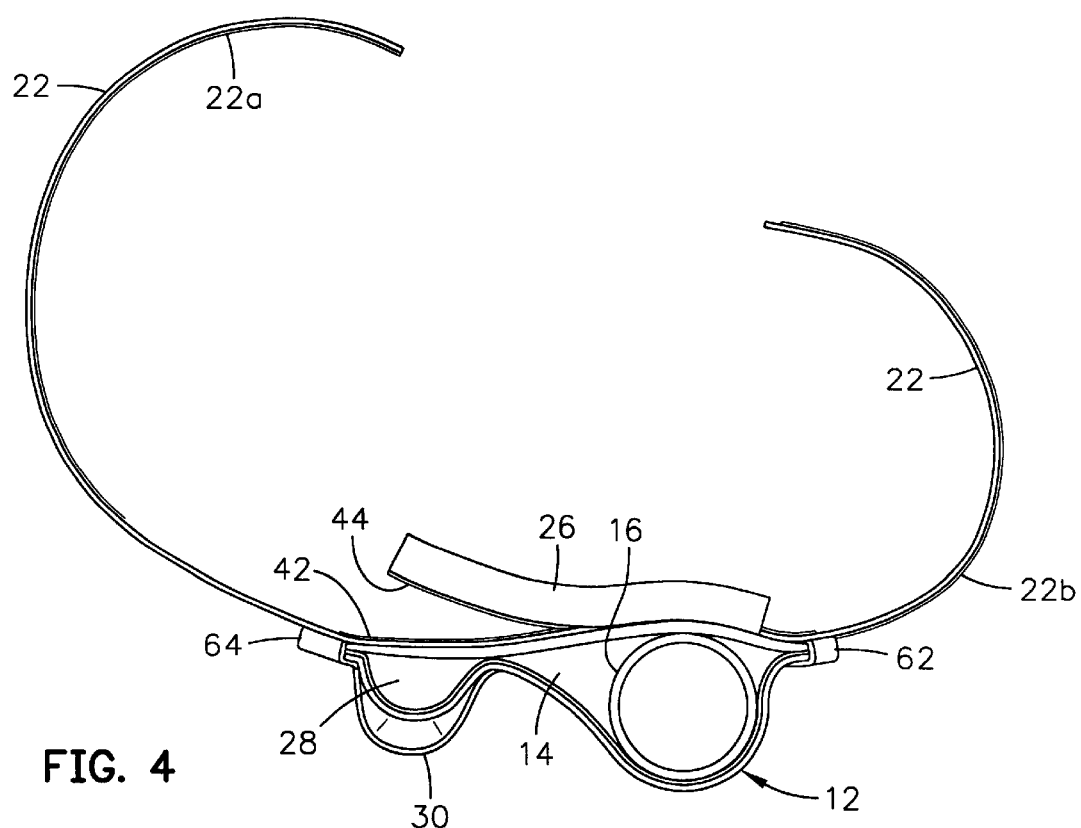
FIG. 4 is a top plan view of the fishing pole holder taken from the top of FIG. 2 with its upper strap partially circled.

Referring to FIGS. 1 and 2, a fishing pole holder 10 in accordance with a preferred embodiment of my invention is illustrated. It should be understood that this embodiment is exemplary only and that my fishing pole holder is subject to a wide variety of design variations as described hereafter. The fishing pole holder 10 includes a holster 12 sewn from durable waterproof fabric to provide a primary pocket 14 (FIG. 4). The primary pocket 14 provides a receptacle for receiving and supporting a rigid plastic tube 16. The tube 16 has a hollow interior dimensioned to slidably receive and removably support the lower handle portion 18a (FIG. 1) of a fishing pole 18. My fishing pole holder 10 is not designed to be used with a fly rod used in trout fishing because it does not have a handle portion that extends rearwardly of its reel that can be inserted into the tube 16.

Figure 3:
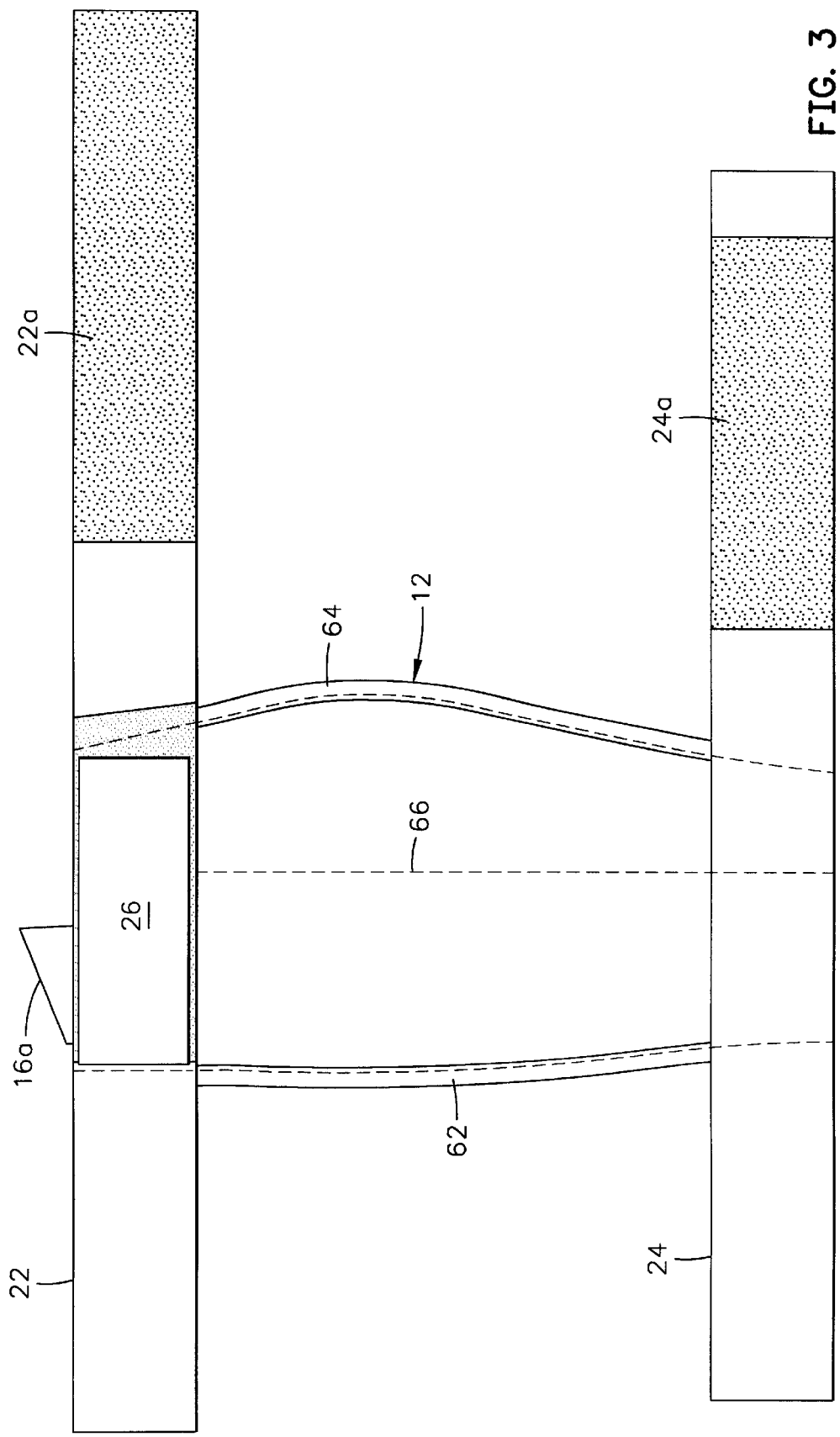
FIG. 3 is an enlarged side elevation view of the rear side of the fishing pole holder of FIG. 1 with its straps laid flat.

The holster 12 is removably held to the outer side of a lower portion 20 of a fisherman's right leg by a pair of straps 22 and 24 (FIGS. 2 and 3) which surround the lower leg portion 20 (FIG. 1) and are releasably secured with mating barb and loop fabric sections as hereafter described in detail. The lower portion 20 of the fisherman's leg includes the shin and the calf. The holster 12 is dimensioned so that it straddles the outer side of the shin and calf. The holster 12 is sized and contoured to fit the lower leg portion 20 with a slightly curved but otherwise substantially straight or vertical leading edge 12a (FIG. 2) and a tapered and curved trailing edge 12b opposite the leading edge 12a. Because the holster 12 is made of a flexible sheet material it can easily mold or conform into a generally convex shape that allows it to comfortably wrap around the fisherman's lower leg portion 20.

Figure 5:
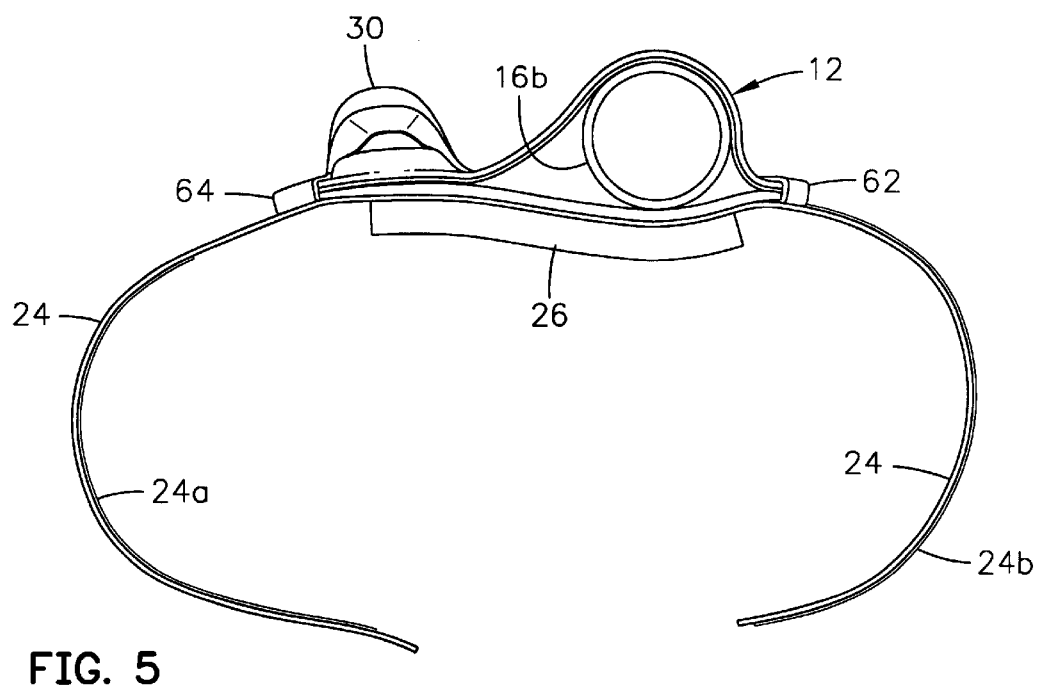
FIG. 5 is a bottom plan view of the fishing pole holder taken from the bottom of FIG. 2 with its bottom strap partially circled.

As illustrated in FIG. 1, the tube 16 is sightly forwardly inclined relative to the fisherman's lower leg portion 20 so that an upper free portion 18b of the fishing pole 18 extends in a forward direction away from a torso 25 of the fisherman. A waterproof spacer 26 (FIGS. 3 and 4) is releasably secured to the rear or inner side of the upper end of the holster 12. The holster 12 is fabricated with a secondary pocket 28 (FIG. 4) and a strap loop 30 (FIGS. 2 and 5) for holding accessory tools such as a fishing knife 32 (FIG. 2) and a pair of fisherman's pliers 34, respectively. The secondary pocket 28 could have a lining (not illustrated) to ease insertion and withdrawal of the fishing knife 32 and prevent the fabric holster 12 from being sliced or torn by its sharp blade. Preferably a BUCK® fillet knife is incorporated into the holder 10 by sewing the holster 12 tightly around its plastic sheath. Means (not illustrated) could also be sewn or otherwise affixed to the holster 12 for holding hooks, flies, and other fishing tackle.

Figure 6:
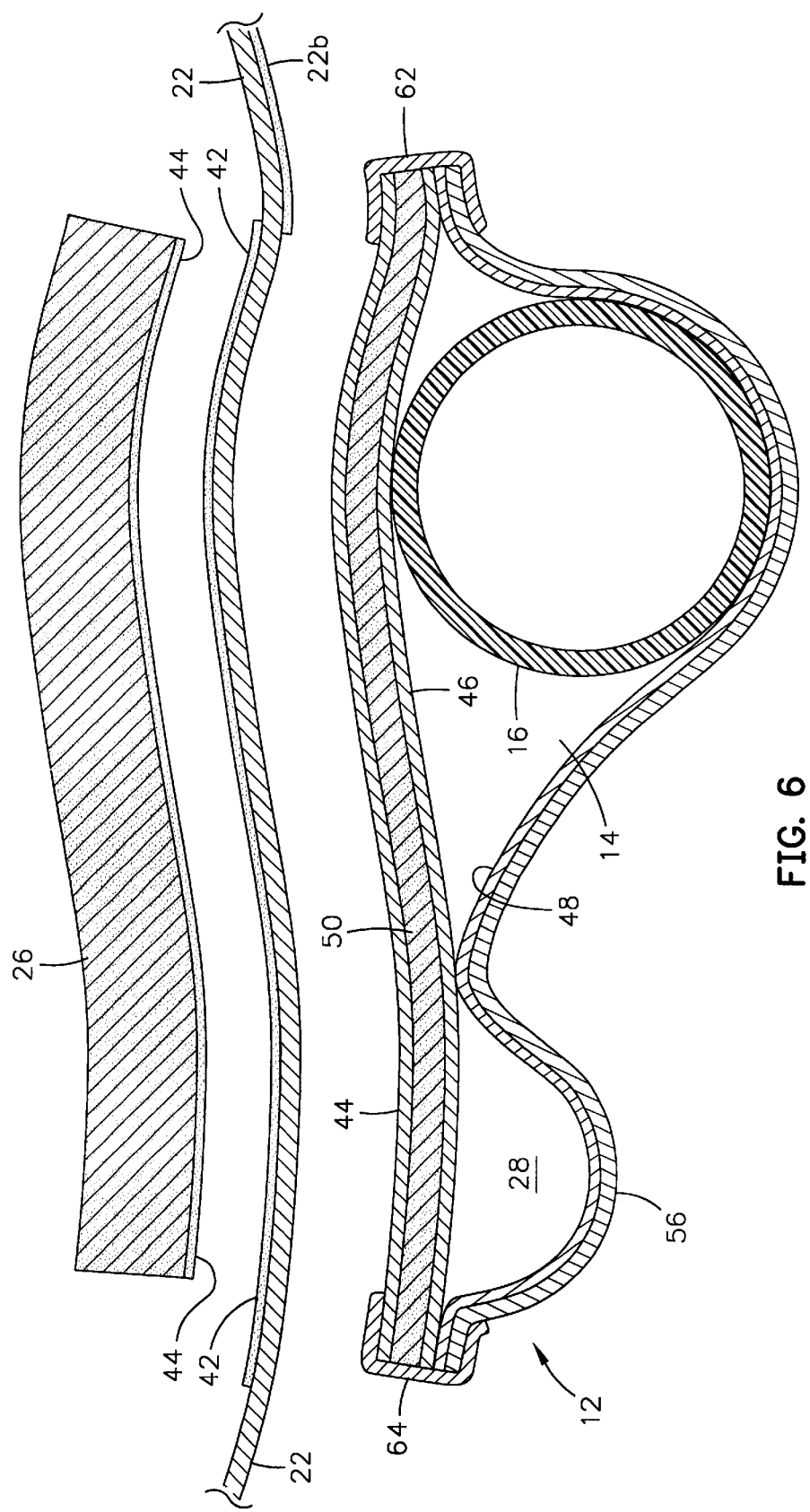
FIG. 6 is a greatly enlarged cross-sectional, exploded view of the fishing pole holder taken along line 6—6 of FIG. 2 illustrating details of its laminate construction.

The spacer 26 (FIGS. 3, 4 and 6) inclines the holster 12 and the tube 16 so that the upper free portion 18b of the fishing pole 18 extends in a sideways (lateral) direction away from the torso of the fisherman. The tip 18c of the fishing pole 18 is therefore positioned in front and to the right of the fisherman for convenient baiting of the hook and removal of fish that have been caught. The fishing pole holder 10 can thus be comfortably used in either a standing or sitting position. Of course the fishing pole holder 10 can be strapped to the lower portion of the fisherman's left leg if the fisherman is left handed. In this case, a mirror image of the holder 12 is fabricated so that the pole holding tube 16 leans forwardly and to the left. The tube 16 should be inclined forwardly a sufficient amount so that the line 35 (FIG. 1) from the fishing pole 18 will easily clear the gunwales of a small boat, such as a bass boat, in which the fisherman is seated. Preferably the tube 16 is inclined forwardly at an angle of between about three degrees and about ten degrees from the vertical axis of the fisherman's lower leg portion 20. Preferably the tube 16 is also inclined laterally at an angle of between about three degrees and about ten degrees from the vertical axis of the fisherman's lower leg portion 20.

It is very important to the convenience of my fishing pole holder 10 that it be sized and configured for mounting to the lower leg portion 20 of the fisherman. This places the handle portion 18a (FIG. 1) of the fishing pole 18 low enough so that its upper free portion 18b and its tip 18c are closer to the fisherman's hands than is the case with the many fishing pole holders that mount the hand portion in a receptacle positioned on, or very close to, the fisherman's waist. When the upper free portion 18b and the tip 18c of the fishing pole 18 are closer to the fisherman's two hands he or she can more easily thread the line 35 through its eyes, attach hooks and other tackle to the line 35, bait hooks, clean fouled hooks and remove fish. Mounting the fishing pole holder 10 to the lower leg portion 20 also achieves the important versatility of my invention, that is to say, it can be used in both a standing position and a seated position. My fishing pole holder 10 could also be mounted to the fisherman's thigh and used in a standing position. However, the thigh is not the preferred body mounting location because the fisherman cannot sit down and still have the fishing pole 18 forwardly inclined. Waist-mounted fishing pole holders typically are in the way if a fisherman tries to sit down in a chair or on a bench. Even if a waist mounted fishing pole holder allows a fisherman to sit down, the fishing pole then extends at the wrong angle because the fisherman's torso is then rearwardly inclined as the fisherman rests against the seat back.

Mounting the fishing pole holder 10 to the lower leg portion is also more comfortable because there are no restrictions or squeezing on the fisherman's waist. The load can be spread over the large area of the holster 12 and its two straps 22 and 24 and comfortably transferred to the fisherman's lower leg portion 20. Also, when sitting with my fishing pole holder 10, the line can easily be "jigged", that is to say, pulled slightly back and forth to attract fish, simply by lifting the heel of the fisherman's right foot up and down. This jigging cannot be readily accomplished with waist-mounted fishing pole holders.

The tube 16 (FIG. 2) provides a reinforcing means that can be readily mounted in the pocket of the holster for slidingly receiving, and removably supporting, the lower handle portion 18a of a fishing pole 18. The tube 16 may be conveniently fabricated from two inch outer diameter ABS, PVC, CPVC or other readily available plastic pipe stock. The tube 16 may have a length of, for example, twelve inches. It serves to provide a more stable support for the fishing pole 18 than would be the case if the lower handle portion 18a were simply slid into the primary pocket 14. However, a serviceable fishing pole holder can be made without the tube 16. In such a case, the primary pocket 14 would be sized for directly receiving and supporting the lower handle portion 18a.

The upper end 16a of the tube 16 (FIG. 2) may tapered for better fit when engaging the reel 18d of the fishing rod 18 which prevents the fishing rod 18 from dropping any lower through the holster 12. The lower end 16b of the tube 16 is kept open to ensure drainage of any water that enters the tube 16. The inner diameter and length of the tube 16 are selected so that the tube 16 will accept the outer diameter and length of the lower handle portion 18a of the widest variety of fishing poles expected to be encountered. The tube 16 has a pair of pilot holes drilled into the same, one near the upper end 16a and one near the lower end 16b, for receiving rivets 36 and 38, respectively. The rivets 36 and 38 permanently secure the tube 16 to the holster 12 at the desired forwardly inclined angle within the pocket 14. This slight forward inclination is visible in FIG. 2 by comparing the side edge of the tube 16 to the straps 22 and 24. The upper end 16a of the tube can be extended well above the upper end of the holster 12 if the fisherman desires to have the fishing pole 18 positioned higher for easier insertion and withdrawal. However, this may place the tip 18c of the rod undesirably far way from the fisherman.

The tube 16 need not necessarily be supported inside the primary pocket 14. Instead, the primary pocket 14 could be eliminated and the tube 16 could be held via rivets 36 and 38 directly to a modified holster (not illustrated) consisting of a cushioned fabric sewn member configured for overlying the lower leg portion 20. The tube 16 could be replaced with other rigid or semi-rigid reinforcing means for removably supporting the lower handle portion 18a of the fishing pole 18, inside the primary pocket 14, or without need for the primary pocket 14. These include a helical metal or plastic coil, a series of vertically and axially spaced rigid rings aligned along the interior of the primary pocket 14, a series of circumferentially spaced guide members lining the interior of the primary pocket 14, or any other mechanical implements coupled to the holster 12 for positively determining and limiting the titling of the fishing pole 18 while slidingly receiving the same.

The fishing pole holder 10 is likely to be frequently immersed in fresh water or salt water as the fisherman wades into a lake, stream or ocean. Therefore, the holster 12 (FIGS. 2 and 3) is preferably made of cut and stitched together panels of durable waterproof synthetic polymer web or woven material such as nylon fabric. Alternatively, the holster 12 could be sewn from other synthetic woven materials such as GORETEX® material, or non-woven synthetic materials such as neoprene that is commonly used to make diver's wet suits. Neoprene is a synthetic rubber produced by the polymerization of chloroprene that produces a closed cell foam structure. Thus neoprene will not absorb water like a sponge and thereby undesirably increase the weight of the fishing pole holder 10. The holster 12 could also be fabricated out of mat or woven materials made of natural fibers such as cotton or wool, e.g. muslin or canvas. However, the holster 12 would have lessened durability and strength if made of such natural fiber materials. The holster 12 could also be fabricated out of various non-fibrous flexible sheet materials such as natural leather or artificial leather materials, e.g. NAUGAHYDE® fabric which is made of a fabric base coated with a decorative wear layer of plastic. The use of the various aforementioned types of flexible sheet material to fabricate the holster 12 ensures user comfort because the holster 12 can mold and conform to the specific shape of the lower leg portion 20 of the fisherman who is wearing the fishing pole holder 10.

The holster 12 could be molded as a curved plastic plate and the tube 16 or other pole supporting means could be separately molded and attached thereto. The entire fishing pole holster could be molded from plastic. The tube 16 could be provided with the proper forward and sideways inclination during integral molding with the plate and or during subsequent process of attaching the tube to the plate. Fabric straps or molded plastic leg clips could be attached to the curved plastic plate. However, the cost for mold tooling and the inherent discomfort of such a design make is a less preferable embodiment than the fabric sewn embodiment illustrated in FIGS. 1–6. Hybrid embodiments of the molded design just described and the preferred embodiment illustrated will occur to those skilled in the art.

The upper and lower straps 22 and 24 (FIGS. 2 and 3) are made of long, thin, generally rectangular pieces of synthetic web or woven material such as nylon fabric. The intermediate segments of each of the straps 22 and 24 are sewn at vertically spaced locations to the rear side of the holster 12. The upper strap 22 is slightly longer than the lower strap 24. The straps 22 and 24 are dimensioned to encircle the fisherman's lower leg portion 20. Adjacent to the terminal free ends of each of the straps 22 and 24 are sewn rectangular sections 22a, 22b, 24a and 24b of mating hook and loop fabric such as VELCRO® fabric. The VELCRO fabric sections 22a and 22b are made of complementary types of VELCRO material and are sewn to opposite sides of the strap 22. The VELCRO fabric sections 24a and 24b are also made of complementary types of VELCRO material and are sewn to opposite sides of the strap 24. The straps 22 and 24 are dimensioned so that they can encircle the fisherman's lower leg and the VELCRO fabric sections 22a and 24a mated with the complementary VELCRO fabric sections 22b and 24b, respectively to releasably secure the holster 12 to the fisherman's lower leg portion 20. The VELCRO fabric sections 22a, 22b, 24a and 24b have a predetermined length sufficient so that they can be overlapped at various locations along their lengths to accommodate lower legs of different sizes.

The fishing pole holder 10 of the present invention could be manufactured in small, medium and large sizes to fit children, women and men, respectively. The straps 22 and 24 could be made of any of the flexible sheet materials identified above. Ties, laces, clasps and other means for releasably securing the holster 12 to the lower leg portion 20 could be utilized instead of the VELCRO equipped straps 22 and 24. Instead of the dual straps 22 and 24 a single strap in the form of an elastic sleeve (not illustrated) could be stitched to the holster 12 so that a fisherman could step through the elastic sleeve with one leg and the holster 12 releasably secured to his or her lower leg.

The holster 12 could alternatively have means for releasably holding the same to the fisherman's leg in the form of a pair of resilient plastic leg clips (not illustrated) each having a gap that could be spread apart to slip around the lower leg portion 20. These C-shaped clips could be riveted or otherwise permanently attached to the rear side of the holster 12, or they could extend from a vertically extending frame secured to the holster 12. The C-shaped clips could alternatively be made of springy metal similar to the clips used by bicycle riders to prevent their pants legs from fouling with the sprocket and chain. However, the leg clips are not preferred because they are less comfortable and less adaptable to different leg sizes than the VELCRO equipped straps 22 and 24.

In another form of my invention, the holster 12 could be sized to completely wrap around the lower leg portion and its abutting vertical side edges releasably secured together with mating VELCRO sections, snaps, buttons, clips, ties, a zipper etc. Alternatively, the holster 12 could have upper and lower integrally formed tabs or arms (not illustrated) extending from its opposite side edges and sized to extend around the lower leg portion and be releasably secured together. Either of these last two embodiments would eliminate the need for the separate straps 22 and 24. It will thus be understood by those skilled in the art that my fishing pole holder can have a variety of means for releasably holding the holster in position against the outer portion of the fisherman's lower leg, a number of examples of which have been described above.

The waterproof spacer 26 (FIG. 6) is preferably made of a block of neoprene three-quarters of an inch in thickness. Mating sections 42 and 44 of VELCRO material are glued to the back of the spacer 26 and stitched to the back of the upper strap 22 so that the spacer 26 can be releasably attached to the holster 12. This allows spacers of different thicknesses to be attached to vary the lateral inclination angle of the fishing pole 18. The location of the spacer 26 on the rear side of the holster 12 can also be adjusted to vary the angle and/or to achieve increased comfort. The spacer 26 has the added advantage of creating a gap between the holster 12 and the fisherman's lower leg portion 20 to allow air flow for cooling of the lower leg portion 20 and/or drying of the holster 12. The neoprene spacer 26, along with the neoprene cushioning layer hereafter described, provide the fishing pole holder 10 with ample buoyancy so that it will float and can be retrieved should it fall overboard. The fishing pole holder 10 preferably has sufficient buoyancy so that it will float even when the knife 32 and pliers 34 are inserted into the same.

The holster 12 is preferably made of brightly colored synthetic fabric, not only for aesthetic appeal, but to additionally facilitate easy visual location of the fishing pole holder 10 should it fall overboard and float away. The fabric construction of the holster 12 and the relatively large surface area of the front side thereof lends itself to having the trademarks of various fishing pole and fishing products manufacturers emblazoned thereon in relatively large font size. Alternatively company names, personal names, or sports team logos could be sewn to, silk screened onto, or otherwise affixed to the holster 12. Trademarks and logos of other non-fishing related products could also be displayed on the holster 12 for advertising purposes.

It is extremely easy and quick to put on and take off my fishing pole holder 10. Its pliant fabric construction provides for comfort during long periods of wearing and walking around while being strapped to the fisherman's lower leg. Comfort is ensured by allowing the straps 22 and 24 to be readily loosened if the device feels too constricting after an hour of use, for example. In addition, my the fishing pole holder 10 clings snugly to the lower leg portion 20. It does not have portions extending any significant distance away from the fisherman's body and it is therefore less likely to snag or catch on branches, boat hardware, etc. It has such a lightweight construction that it does not hamper the fisherman's mobility or lead to fatigue after many hours of being carried around.

Further details of the construction of my fishing pole holder 10 can be best understood in connection with a description of its preferred method of fabrication. The holster 12 has a laminate construction including a back panel 44 (FIG. 6), an intermediate panel 46 and a top panel 48, all cut from the same woven synthetic fabric. The panels 44 and 46 have the identical tapered outline whereas the top panel 48 has a similar but slightly wider shape. A neoprene cushioning layer 50 having an identical outline to the fabric panels 44 and 46 is sandwiched between the back fabric panel 44 and the intermediate fabric panel 46. The neoprene cushioning layer 50 may have a thickness of, for example, one-quarter of an inch. For the sake of convenience, contact cement may be used to hold these three layers together to allow them to be stitched together around their perimeters with nylon thread using an industrial sewing machine with a needle sufficiently strong to pierce all three layers simultaneously.

Reinforcing straps 56 and 58 (FIGS. 2 and 6) made of thick woven nylon fabric are stitched at vertically spaced locations to the top panel 48. The straps 56 and 58 have the same width as the holster 12. An intermediate segment of the top reinforcing strap 56 is left unstitched to provide the loop 30 that is sized to receive and support the fisherman's pliers 34. The loop 30 is sufficiently small so that when the jaws of the fisherman's pliers 34 are inserted through the loop 30 from the top side the handle portions of the pliers 34 will be too large to pass through the loop 30. The next step of the fabrication process involves forming the upper and lower straps 22 and 24 and the stitching thereto of the VELCRO fabric sections 22a, 22b, 24a and 24b. The mating sections 42 and 44 of VELCRO are glued to the back of the neoprene spacer block 26 and stitched to what will become the rear side of the upper strap 22.

The next step in fabricating the fishing pole holder 10 involves stitching piping or edging 62 and 64 (FIGS. 2–6) around the side edges of the panels 44, 46 and 48 and the cushioning layer 50. This creates an assembly that creates a large pocket between the top panel 48 and the intermediate panel 46. Vertical stitching 66 (FIGS. 2 and 3) is then applied to this assembly to define the primary pocket 14 and the secondary pocket 28. The stitching 66 extends normal or perpendicular to the straps 22 and 24 and essentially bisects the holster 12. The upper and lower straps 22 and 24 are then stitched over the rear side of the back panel 44 with equal sized free segments extending on either side of the holster 12.

The final steps in fabricating the fishing pole holder 10 involve cutting an appropriate length of plastic pipe to provide the tube 16. The upper end 16a of the tube 16 is cut with a taper to better engage the reel 18d of the fishing pole 18. Circumferentially aligned pilot holes are drilled into the upper and lower ends 16a and 16b of the tube 16. The tube 16 is then inserted into the primary pocket 14 and the rivets 36 and 38 are fastened through the top panel 48 into the pilot holes in the tube 16 to secure the tube in place in the primary pocket 14.

If desired, an elastic or non-elastic cord, rope, line or other lanyard (not illustrated) can have its inner end sewn or otherwise permanently attached to the holster 12 or tube 16. The outer end of the lanyard can be releasably secured to the reel 18d of the fishing pole 18 with a clip for purposes of tethering the fishing pole 18 to the fishing role holder 10. In connection with deep sea fishing, this will prevent accidental loss of a valuable fishing pole otherwise resulting from a hit or strike from a large and powerful game fish. A dorado, marlin, tuna or wahoo can easily pull an untethered fishing pole out of the tube 16 and overboard. Such a lanyard is generally not necessary in connection with fresh water fishing.

My fishing pole holder 10 enables a fisherman to perform a novel, more relaxing and convenient method of fishing. The first step of my method involves providing the fishing pole 18 (FIG. 1). The fishing pole 18 has a lower handle portion 18a, an upper free portion 18b and a tip 18c. The fishing pole 18 also has a reel 18d, and a fishing line 35 wound about the reel 18d. The fishing line 35 is threaded along the upper free portion 18b of the fishing pole 18, and a hook is connected to a terminal end of the fishing line. The second step of my method involves removably securing the holster 12 to the lower leg portion 20 of the fisherman. The holster 12 is sized to overlie the lower leg portion 20 of the fisherman and has the forwardly inclined receptacle 14 for removably receiving the lower handle portion 18a of the fishing pole 18. The holster 12 provides the sole support for the fishing pole 18 without requiring any use of a hand or an arm of the fisherman. The third step of my method involves inserting the lower handle portion 18a of the fishing pole 18 into the receptacle 14 of the holster 12 so that the upper free portion 18b of the fishing pole extends forwardly away from a torso of the fisherman. The next step of my method involves baiting the hook with both hands. The fishing pole 18 is then removed from the holster 12 with either or both hands of the fisherman. The fisherman then casts the fishing pole 18 so that the hook lands in the desired location in the body of water. The lower handle portion 18a of the fishing pole 18 is re-inserted into the receptacle 14 of the holster 12. The fisherman then waits patiently for a fish to strike the bait on the hook. When this occurs, the fishing pole 18 is once again removed from the holster 12 with either or both hands of the fisherman who sets the hook in the mouth of the fish by jerking back on the fishing pole 18. The fishing pole 18 is then reeled in to retrieve the fish that has been hooked. The lower handle portion 18a of the fishing pole 18 is re-inserted into the receptacle 14 of the holster 12. The fish is removed from the hook with both hands of the fisherman and thrown back into the water if the fisherman is practicing "catch and release" or thrown into a bag, bucket or other receptacle if the fish is to be eaten. The foregoing steps are repeated to accomplish convenient two-handed baiting of the fishing pole and two-handed removal of fish that are caught.

While I have described a preferred embodiment of my fishing pole holder in detail, along with a method of fishing with the same, modifications and adaptations of my fishing pole holder will occur to those skilled in the art. As used hereafter in the claims the terms "means for attaching" and "means for securing" are intended to encompass various conventional permanent connecting techniques such as stitching, welding, gluing, riveting, stapling, and so forth. The terms "means for releasably attaching" and "means for releasably securing" include various conventional temporary connection techniques such as mating sections of hook and loop VELCRO and similar fabrics, buttons, zippers, buckles, clasps, pins, laces, ties and so forth. Therefore the protection afforded my invention should not be limited to the embodiments described, but should only be limited in accordance with the scope of the following claims.

What is claimed is:

1. A fishing pole holder, comprising:

holster means sized to overlie an outer lower leg portion of a fisherman for removably receiving a lower handle portion of a fishing pole and providing the sole support for the fishing pole without requiring any auxiliary holder connected to any other portion of the fishing pole or the use of a hand or an arm of the fisherman, wherein the holster means includes a rigid tube and a primary pocket for holding the tube, the tube being dimensioned for slidably receiving the lower handle portion of the fishing pole in a hollow interior thereof;

means for removably securing the holster means to the lower leg portion of the fisherman; and the holster means being configured for inclining the lower handle portion of the fishing pole in a forward direction away from the outer lower leg portion of the fisherman so that an upper free portion of the fishing pole extends in a generally upright orientation with the upper free portion of the pole being inclined in the forward direction away from a torso of the fisherman to position a tip of the pole for convenient two-handed baiting of a hook attached to a fishing line of the fishing pole and two-handed removal of a fish from the hook.

2. The fishing pole holder of claim 1 wherein the holster means further includes at least one secondary pocket for holding an accessory tool.

3. The fishing pole holder of claim 2 wherein the secondary pocket is configured to provide a knife sheath.

4. The fishing pole holder of claim 1 and further comprising spacer means secured to an upper end of the holster means for also inclining the lower handle portion of the fishing pole in a sideways direction away from the outer lower leg portion of the fisherman so that the upper free portion of the fishing pole also extends in the sideways direction away from the torso of the fisherman.

5. The fishing pole holder of claim 1 wherein the means for removably securing the holster means to the lower leg portion includes upper and lower straps attached to the holster means and dimensioned to extend around the lower leg portion.

6. The fishing pole holder of claim 5 wherein the means for releasably securing the holster means to the lower leg portion includes mating sections of hook and loop fabric for releasably attaching the corresponding ends of the upper and lower straps together.

7. The fishing pole holder of claim 1 wherein the primary pocket of the holster means is made of a woven waterproof synthetic material.

8. A fishing pole holder adapted for mounting to a fisherman's leg, comprising:

a holster made of a flexible sheet material, the holster being sized to overlie an outer portion of a fisherman's leg;

means for releasably holding the holster against the fisherman's leg; and reinforcing means mounted to the holster for slidingly receiving and removably supporting a lower handle portion of a fishing pole, wherein the reinforcing means is a rigid tube;

whereby convenient two-handed baiting of a hook attached to a fishing line of the fishing pole and two-handed removal of a fish from the hook can be accomplished by inserting the lower handle portion of the fishing pole into the tube.

9. The fishing pole holder of claim 8 wherein the holster is formed with an upwardly opening pocket and the reinforcing means is mounted in the pocket.

10. The fishing pole holder of claim 8 wherein the tube is inclined to position an upper free portion of the fishing pole in a direction forward of a torso of the fisherman.

11. The fishing pole holder of claim 8 and further comprising a spacer attached to a rear side of the holster for inclining the upper free portion of the fishing pole in a direction lateral of the torso of the fisherman.

12. The fishing pole holder of claim 8 wherein the flexible sheet material is a woven fabric.

13. The fishing pole holder of claim 8 wherein the holster is formed with means for holding an accessory tool.

14. The fishing pole holder of claim 8 wherein the releasably holding means includes upper and lower straps attached to a pair of vertically spaced locations on the holster and two pairs of mating barb and loop fabric sections that releasably attach a pair of terminal ends of each of the straps after they have been wrapped around the fisherman's leg.

15. The fishing pole holder of claim 8 wherein the holster has a laminate construction.

16. A fishing pole holder adapted for mounting to a fisherman's leg, comprising:

a holster made of a laminate construction of a woven fabric, the holster being sized to overlie an outer portion of a fisherman's leg and being formed with an upwardly opening pocket and means for holding an accessory tool;

means for releasably holding the holster against the fisherman's leg including upper and lower straps attached to a pair of vertically spaced locations on the holster and two pairs of mating barb and loop fabric sections for releasably attaching a pair of terminal ends of each of the straps after they have been wrapped around the fisherman's leg;

a rigid tube mounted in the pocket for slidably receiving and removably supporting a lower handle portion of a fishing pole, the tube being inclined to position an upper free portion of the fishing pole in a direction forward of a torso of the fisherman; and a spacer attached to a rear side of the holster for inclining the upper free portion of the fishing pole in a direction lateral of the torso of the fisherman;

whereby convenient two-handed baiting of a hook attached to a fishing line of the fishing pole and two-handed removal of fish from the hook can be accomplished by inserting the lower handle portion of the fishing pole into the tube.

* * * * *